US005653775A

United States Patent [19]
Plovnick et al.

[11] Patent Number: 5,653,775
[45] Date of Patent: Aug. 5, 1997

[54] MICROWAVE SINTERING OF SOL-GEL DERIVED ABRASIVE GRAIN

[75] Inventors: Ross Plovnick, St. Louis Park; Ahmet Celikkaya, Woodbury, both of Minn.; Rodger D. Blake, Tuscon, Ariz.

[73] Assignee: Minnesota Mining and Manufacturing Company, St. Paul, Minn.

[21] Appl. No.: 592,763

[22] Filed: Jan. 26, 1996

[51] Int. Cl.$^6$ .................................................. C09C 1/08
[52] U.S. Cl. ............................... 51/309; 204/157.43
[58] Field of Search .................. 51/293, 309; 264/25, 264/26; 204/157.43

[56] References Cited

U.S. PATENT DOCUMENTS

| | | | |
|---|---|---|---|
| 3,909,991 | 10/1975 | Coes, Jr. | 51/309 |
| 4,314,827 | 2/1982 | Leitheiser et a. | 51/298 |
| 4,431,164 | 2/1984 | Jungo et al. | 252/628 |
| 4,623,364 | 11/1986 | Cottringer et al. | 51/309 |
| 4,744,802 | 5/1988 | Schwabel | 51/309 |
| 4,880,578 | 11/1989 | Holcombe et al. | 264/26 |
| 4,881,951 | 11/1989 | Wood et al. | 51/309 |
| 4,941,905 | 7/1990 | Narasimham | 65/3.12 |
| 4,963,709 | 10/1990 | Kimrey, Jr. | 219/10.55 M |
| 5,011,508 | 4/1991 | Wald et al. | 51/293 |
| 5,090,968 | 2/1992 | Pellow | 51/293 |
| 5,164,130 | 11/1992 | Holcombe et al. | 264/26 |
| 5,164,348 | 11/1992 | Wood | 501/127 |
| 5,191,183 | 3/1993 | Balbaa et al. | 219/10.55 M |
| 5,213,591 | 5/1993 | Celikkaya et al. | 51/293 |
| 5,223,186 | 6/1993 | Eastman et al. | 264/25 |
| 5,227,600 | 7/1993 | Blake et al. | 219/10.55 M |
| 5,252,267 | 10/1993 | Holcombe et al. | 264/26 |
| 5,302,564 | 4/1994 | Winkler et al. | 501/127 |
| 5,312,791 | 5/1994 | Coblenz et al. | 501/153 |
| 5,449,887 | 9/1995 | Holcombe et al. | 219/679 |
| 5,453,225 | 9/1995 | Morrow et al. | 264/432 |
| 5,536,292 | 7/1996 | Holcombe et al. | 65/23 |
| 5,542,961 | 8/1996 | Swei et al. | 51/295 |

FOREIGN PATENT DOCUMENTS

| | | | |
|---|---|---|---|
| 9100520 | 12/1991 | Australia | C04B 35/10 |
| WO95/26940 | 10/1995 | WIPO | C04B 35/64 |

OTHER PUBLICATIONS

J. Cheng et al., "Microwave Continuous Processing Alumina Abrasive Grains" in *Materials Research Society Abstracts*, Abstract No. 03.2, p. 244, 1996.

Clark, D.E., "Microwave Processing: Present Status And Future Promise," *Ceram. Eng. Sci. Proc.* 14, [7–8], 3–21, (1993).

Clark et al., "Recent Developments In The Microwave Processing Of Ceramics," *MRS Bulletin*, Nov. 1993, pp. 41–46.

Katz et al., "Microwave Sintering Of Multiple Alumina And Composite Components," *Ceramic Bulletin*, vol. 70, No. 8, 1991, pp. 1304–1308.

Vogt et al., "Processing Aerosols And Filaments In A $TM_{010}$ Microwave Cavity At 2.45 GHZ," Published in the *Proceedings of Symposium L, Microwave Processing of Materials, 1992 Spring MRS Meeting*, San Francisco, CA, Apr. 27–May 1, 1992.

Vogt et al. "Microwave Hybrid Heating Of Alumina Filaments," Published in the *Proceedings Of Symposium XII Microwaves: Theory and Application in Materials Processing II, 95th Annual Meeting of the American Ceramic Society*, Cincinnati, Ohio, Apr. 18–22, 1993.

Katz, Joel D., "Microwave Sintering Of Ceramics," *Annu. Rev. Mater. Sci.*, vol. 22, pp. 153–170, 1992.

(List continued on next page.)

*Primary Examiner*—Deborah Jones
*Attorney, Agent, or Firm*—Gary L. Griswold; Walter N. Kirn, Jr.; Gregory D. Allen

[57] ABSTRACT

A method is provided for making microwave-sintered, free flowing alpha alumina-based ceramic abrasive grain, under conditions effective to couple microwaves with calcined alpha alumina-based abrasive gain precursor and sinter it at a temperature of at least about 1150° C.

25 Claims, 1 Drawing Sheet

OTHER PUBLICATIONS

Kumar et al., "Production Of Ultra–Fine Silicon Carbide By Fast Firing In Microwave And Resistance Furnaces," *Ceramic Transactions*, vol. 21, pp. 395–402, 1991.

Wroe et al., "Microwave Sintering Of Advanced Ceramics," *Br. Ceram. Proc. (UK)*, vol. 50, pp. 39–51, 1993.

Sutton, Willard H., "Microwave Processing Of Materials," *MRS Bulletin*, Nov. 1993, pp. 22–24.

MICROWAVE SINTERING OF SOL-GEL DERIVED ABRASIVE GRAIN

The present invention was jointly developed under a Funds-in Agreement No. DE-F104-91AL73655 between the 3M Company and Los Alamos National Laboratory. The Government has certain rights in the invention.

FIELD OF THE INVENTION

The present invention relates to a method for making microwave sintered alpha alumina-based ceramic abrasive grain.

DESCRIPTION OF THE RELATED ART

Microwave sintering of ceramic materials, such as alumina, zirconia, and silicon nitride, has been studied intensively in recent years. Microwave radiation very efficiently and rapidly heats the materials to the relatively high temperatures required for sintering. In contrast to conventional thermal processing (e.g., electrical resistance heating and gas firing), microwave processing involves generally uniform volumetric heating. Potential advantages offered by microwave processing include faster heating rates, lower processing costs, less energy usage, elimination of the need for massive thermal insulation because the process is cold-wall in nature, and unique and useful ceramic microstructures.

Typically, at room temperature, metal oxides are generally transparent to microwaves. At elevated temperatures, however, metal oxides typically become "lossy," at which point microwaves interact with the material (i.e., couple), resulting in internal heating. Thus, metal oxides are typically preheated in a process prior to subjecting them to microwave radiation. Alternatively, a material that is capable of absorbing, or coupling with, microwave radiation, such as boron carbide, silicon boride, or titanium nitride, is placed in close proximity to the metal oxide during the microwave sintering process. This material absorbs microwave radiation and transfers thermal energy to the metal oxide until it reaches the temperature at which it absorbs, or couples with, microwave radiation.

Generally, microwave sintering of ceramic metal oxides involves pressing a powder of the metal oxide into a shaped article and sintering the article, thereby forming monoliths of structural ceramic materials. See, for example, U.S. Pat. No. 4,880,578 (Holcombe et al.), which discloses a process for microwave sintering a compact of particulate metal oxides by enclosing it in a housing formed of an oxide that has microwave coupling properties at room temperature up to at least the microwave coupling temperature of the oxide material forming the compact.

Very little has been done with the use of microwave radiation in the sintering of free flowing, sol-gel derived ceramic abrasive grain. For example, methods for preparing sintered alpha alumina-based ceramic abrasive grain, such as those disclosed in U.S. Pat. No. 3,909,991 (Coes), U.S. Pat. No. 4,314,827 (Leitheiser), U.S. Pat. No. 4,623,364 (Cottringer), U.S. Pat. No. 4,744,802 (Schwabel), U.S. Pat. No. 4,881,951 (Wood et al.), and U.S. Pat. No. 5,312,791 (Coblenz et al.), do not involve microwave sintering.

It is difficult to control the desired balance of density and grain (i.e., crystal or crystallite) size of sol-gel derived ceramic abrasive grain during sintering. This balance generally relates to heating rate, temperature, and time held at the desired temperature. For example, if the heating rate is too low, undesired excess crystallite growth may occur, which in turn typically results in reduced grinding performance. On the other hand, if the heating rate is too high, the density of the resulting material may not be as high as desired, which also results in a reduced grinding performance. Furthermore, if sintering is carried out for too long a period of time, the crystallite size may be too large; whereas, if it is carried out for too short a period of time, the density may be too low.

U.S. Pat. No. 5,302,564 (Winklet et al.) discloses that cerium- and chromium-containing alpha alumina-based ceramic abrasive grain can be prepared using microwave radiation. However, the disclosed process involves sintering in several stages, preferably under elevated gas pressures with a nonoxidizing gas such as nitrogen. It also involves total sintering times on the order of several hours. For most alpha alumina-based ceramic abrasive grain this can result in extremely large crystallite size, which will drastically reduce the grinding performance of the grain.

Thus, what is needed is a microwave sintering process for the preparation of sol-gel derived alpha alumina-based ceramic abrasive grain that is simpler and more efficient with respect to lower processing costs and energy use.

SUMMARY OF THE INVENTION

The present invention provides a method for making free flowing, sintered alpha alumina-based ceramic abrasive grain, the method comprising:

(a) providing a microwave sintering apparatus comprising a cavity, a microwave generator for generating microwaves and directing them into said cavity, and a power supply for powering said microwave generator;

(b) providing a free flowing, sol-gel derived, calcined alpha alumina-based ceramic abrasive grain precursor in said cavity; and (c) generating microwaves under conditions effective to couple said microwaves with said calcined abrasive grain precursor and to sinter said calcined abrasive grain precursor at a temperature of at least about 1150° C. to provide free flowing, sintered alpha alumina-based ceramic abrasive grain having a density of at least about 85% of theoretical and a hardness of at least about 16 GPa; wherein the time from the initiation of coupling microwaves with said calcined abrasive grain precursor to the completion of sintering is no greater than about 60 minutes.

The present invention also provides a method for making free flowing, sintered alpha alumina-based ceramic abrasive grain, the method comprising the steps of:

(a) providing a microwave sintering apparatus comprising a cavity, a microwave generator for generating microwaves and directing them into said cavity, and a power supply for powering the microwave generator;

(b) providing a free flowing, sol-gel derived, calcined alpha alumina-based ceramic abrasive grain precursor in said cavity;

(c) providing an auxiliary susceptor material in close proximity to said calcined abrasive grain precursor in said cavity; wherein said auxiliary susceptor material is capable of coupling with said microwaves at a temperature below that at which said calcined abrasive grain precursor couples with said microwaves, and is capable of transferring thermal energy to said calcined abrasive grain precursor;

(d) generating microwaves under conditions effective to couple said microwaves with said auxiliary susceptor material and transfer thermal energy to said calcined abrasive grain precursor until said calcined abrasive grain precursor reaches a temperature effective to couple with said microwaves;

(e) generating microwaves under conditions effective to couple with said calcined abrasive grain precursor and raise the temperature of the calcined abrasive grain precursor to an effective sintering temperature; and (f) generating microwaves under conditions effective to sinter said calcined abrasive grain precursor at a temperature of at least about 1150° C. for no greater than about 60 minutes to provide free flowing, sintered alpha alumina-based ceramic abrasive grain having a density of at least about 85% of theoretical and a hardness of at least about 16 GPa.

Finally, the present invention provides a method for making an abrasive product, the method comprising:

(a) providing a microwave sintering apparatus comprising a cavity, a microwave generator for generating microwaves and directing them into said cavity, and a power supply for powering said microwave generator;

(b) providing a container made of fibrous zirconia in said cavity;

(c) providing a plurality of free flowing, sol-gel derived, calcined alpha alumina-based ceramic abrasive grain precursor inside said fibrous zirconia container;

(d) generating microwaves under conditions effective to couple said microwaves with said fibrous zirconia and transfer thermal energy to said calcined abrasive grain precursor until said calcined abrasive grain precursor reaches a temperature effective to couple with said microwaves;

(e) generating microwaves under conditions effective to couple with said calcined abrasive grain precursor and raise the temperature of the calcined abrasive grain precursor to an effective sintering temperature; and (f) generating microwaves under conditions effective to sinter said calcined abrasive grain precursor at a temperature of at least about 1150° C. for no greater than about 60 minutes to provide free flowing, sintered alpha alumina-based ceramic abrasive grain having a density of at least about 85% of theoretical and a hardness of at least about 16 GPa;

(g) incorporating said sintered alpha alumina-based ceramic abrasive grain into an abrasive product.

As used in the present application:

"Dispersion" or "sol" refers to a solid-in-liquid two-phase system wherein one phase comprises freely divided particles (in the colloidal size range) distributed throughout a liquid. The sol is converted to a gel during processing.

"Free flowing, sol-gel derived, alpha alumina-based ceramic abrasive grain precursor" refers to a dried alumina-based dispersion (which dispersion is typically a gel) prepared by a sol-gel process or a calcined alumina-based dispersion (which dispersion is typically a gel) in the form of particles, which may be partially sintered, that have a density of less than about 85% (typically less than about 60%) of theoretical, and are capable of being sintered, or impregnated with an impregnation composition and then sintered to provide free flowing, sintered alpha alumina-based ceramic abrasive grain. The dried alumina-based dispersion is referred to herein as "free flowing, sol-gel derived, dried alpha alumina-based ceramic abrasive grain precursor" and the calcined alumina-based dispersion is referred to herein as "free flowing, sol-gel derived, calcined alpha alumina-based ceramic abrasive grain precursor" (or shortened versions thereof, e.g., "dried abrasive grain precursor" and "calcined abrasive grain precursor," respectively).

"Free flowing, sintered alpha alumina-based ceramic abrasive grain" or "sintered abrasive grain" refer to sintered alumina-based abrasive grain in the form of particles, that have been sintered to a density of at least about 85% (preferably, at least about 90%, and more preferably, at least about 95%) of theoretical, and contain, on a theoretical oxide basis, at least about 60% by weight $Al_2O_3$, wherein at least about 50% by weight of the total mount of $Al_2O_3$ is present as alpha alumina.

"Impregnation composition" refers to a solution or dispersion of a liquid medium and a metal oxide and/or precursor thereof that can be impregnated into abrasive grain precursor.

"Impregnated abrasive grain precursor" refers to dried alumina-based dispersion or calcined alumina-based dispersion that has a density of less than about 85% (typically less than about 60%) of theoretical, that have been impregnated with an impregnation composition. This includes impregnated dried particles and impregnated calcined particles.

"Nucleating material" refers to material that enhances the transformation of transitional alumina(s) to alpha alumina. The nucleating material can be the nucleating agent itself or a precursor thereof.

"Transitional alumina" refers to any crystallographic form of alumina that exists after heating the hydrated alumina to remove the water of hydration prior to transformation to alpha alumina (e.g., eta, theta, delta, chi, iota, kappa, and gamma forms of alumina and intermediate combinations of such forms).

DESCRIPTION OF PREFERRED EMBODIMENTS

Figure 1:
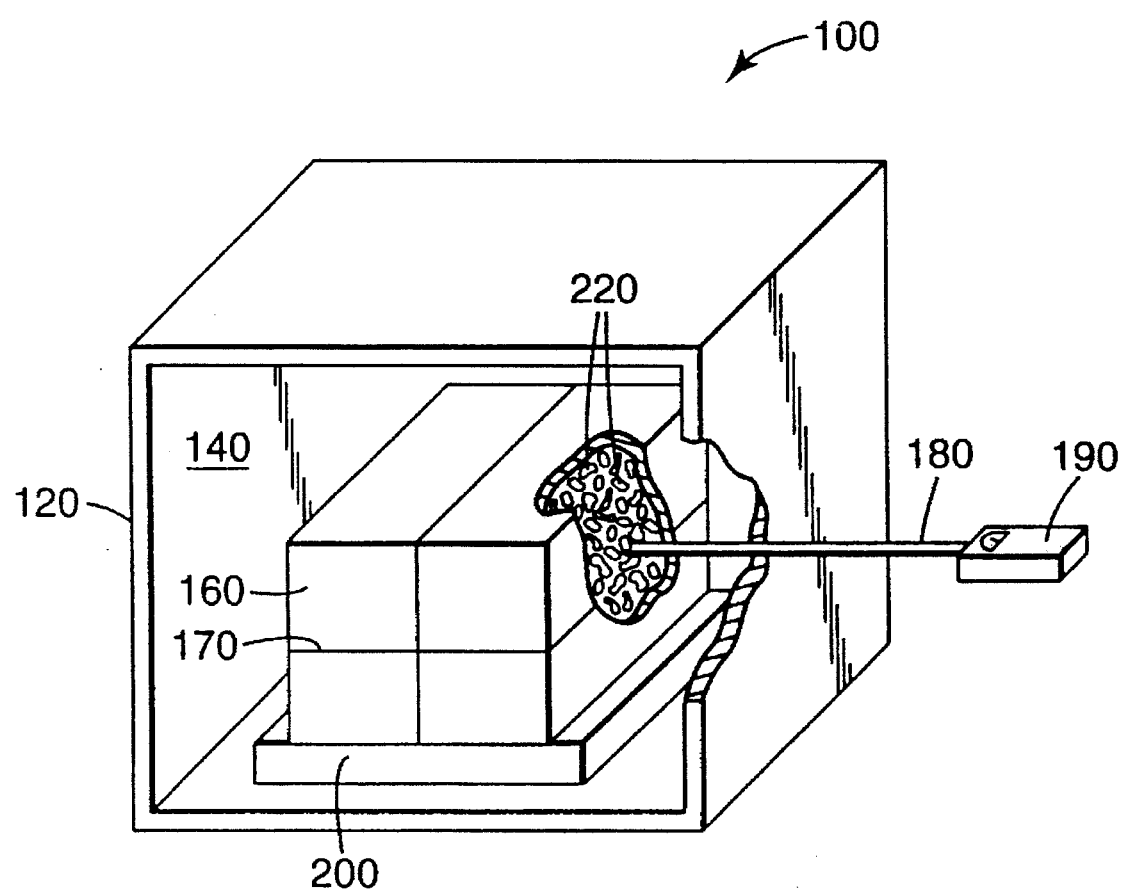
FIG. 1 is a schematic illustration showing a microwave furnace having a container with alpha alumina-based abrasive grain precursor therein for sintering purposes.

The present invention provides a method for making free flowing, sintered alpha alumina-based ceramic abrasive grain from free flowing, sol-gel derived dried or calcined (preferably, calcined) alpha alumina-based ceramic abrasive grain precursor via microwave sintering.

Preparation of Calcined Alpha Alumina-Based Abrasive Grain Precursor

Suitable calcined alpha alumina-based ceramic abrasive grain precursor can be prepared by sol-gel processes such as those disclosed, for example, in U.S. Pat. No. 4,881,951 (Wood et al.), U.S. Pat No. 4,770,671 (Monroe et al.), U.S. Pat. No. 4,744,802 (Schwabel), U.S. Pat. No. 4,574,003 (Gerk), U.S. Pat. No. 4,314,827 (Leitheiser et al.), U.S. Pat. No. 4,964,883 (Morris et al.), and U.S. Pat. No. 5,201,916 (Berg et al.), the disclosures of which are incorporated herein by reference, and U.S. Pat. No. 4,623,364 (Cottringer et al.). In a typical sol-gel process, alpha-aluminum oxide monohydrate (usually boehmite) is dispersed in water to provide a sol, which is then gelled, converted into grain precursor by drying and crushing or shaping, and calcined. The sol can include a nucleating material (i.e., a "seed"). During calcining, additional volatiles are removed, and the various components present in the sol are transformed into oxides.

Preferably, the calcined alpha alumina-based ceramic abrasive grain precursor is prepared by a sol-gel process employing a dispersion that includes about 2–60 percent by weight (wt-%) alpha aluminum oxide monohydrate (typically boehmite), although other hydrates may be used. The weight percent is based on a total of hydrate plus liquid carrier, without regard to adjuvants or additives. The boehmite can be prepared by a variety of conventional techniques, or it can be acquired commercially. Suitable boehmite is commercially available, for example, under the trade designations "DISPERAL" from Condea Chemie, GmbH, of Hamburg, Germany, and "DISPAL" from Vista Chemical Co. of Houston, Tex. These aluminum oxide monohydrates are in alpha form, are relatively pure (including relatively little, if any, hydrate phases other than monohydrate), and have a high surface area. The typical and preferred liquid carrier is deionized water.

A peptizing agent or dispersion aid may be used in the boehmite dispersion to produce a more stable hydrosol or colloidal dispersion. Typically, monoprotic acids are used as the peptizing agent. Suitable monoprotic acids include acetic, hydrochloric, formic, and nitric acids. Nitric acid is preferred. Multiprotic acids are normally to be avoided because they rapidly gel the dispersion, making it difficult to handle or mix in additional components. Some commercial sources of boehmite contain an acid titer (e.g., acetic, formic, or nitric acid) to assist in forming a stable dispersion.

Mechanical mixing means, such as ball mill, pebble mill, attritor mill, or low shear mixer, are generally used to achieve the dispersion. Alternatively, ultrasonic energy can be used to aid in mixing the dispersion. Furthermore, a defoamer may be added to the dispersion to aid in the reduction of froth or foam during the mixing process. Common defoamers include alcohols.

The boehmite dispersion optionally includes a precursor of an oxide modifier (e.g., oxides of magnesium, zinc, cobalt, nickel, zirconium, hafnium, iron, lithium, silicon, manganese, chromium, yttrium, calcium, lithium, sodium, strontium, praseodymium, cerium, samarium, ytterbium, neodymium, lanthanum, gadolinium, cerium, dysprosium, erbium, titanium, and mixtures thereof) which enhances some desired property of the sintered abrasive particle or increases the effectiveness of a subsequent processing step (e.g., the sintering step). Such precursors are generally introduced in the form of a salt (typically a metal salt material) soluble in the liquid carrier of the dispersion. Typically, the precursor is a water soluble metal salt. For additional details regarding the inclusion of manganese oxide and precursors thereof in the dispersion, see PCT Application No. PCT/US93/12441 having International Publication No. WO 94/14722, published Jul. 7, 1994, the disclosure of which is incorporated herein by reference.

The dispersion may contain a nucleating material to enhance the transformation of the alpha alumina precursor to alpha alumina. Suitable nucleating materials include fine particles of alpha alumina, or fine grain or precursors of alpha ferric oxide, chromia, titanates, and other materials that will nucleate the transformation. Nucleating materials are disclosed, for example, in U.S. Pat. No. 4,744,802 (Schwabel), U.S. Pat. No. 4,964,883 (Morris et al.), and U.S. Pat. No. 5,219,806 (Wood), the disclosures of which are incorporated herein by reference.

The dispersion can be formed by any suitable means. For example, the dispersion can be formed by simply introducing the aluminum oxide monohydrate, optional additives, and water carrier to a ball mill or other satisfactory mixing device, and mixing until the resulting dispersion is acceptable. Once the dispersion is formed, it is then gelled and/or dried (i.e., dewatered). The gel can be formed by any conventional technique such as the addition of a dissolved or dispersed metal-containing modifying additive (e.g., magnesium nitrate), or the sol can be at least partially dewatered to form the gel. Common dewatering techniques include air drying in an oven or in ambient conditions, introducing a vacuum, decanting, filtering, and pressing. Techniques such as freeze drying, liquid extraction, or the use of supercritical liquids are also suitable means for dewatering the dispersion. Drying under pressure at about 100° C. or by high pressure dewatering techniques (such as high pressure filter pressing or use of high pressure candle filters) is also useful.

If it is desired that the resulting sintered alpha alumina-based ceramic abrasive grain include zirconium oxide and/or cerium oxide, a preferred method for introducing zirconium oxide and/or cerium oxide is by adding zirconia particles and/or ceria particles to the alpha aluminum oxide monohydrate dispersion prior to gelation. These materials can be added to the dispersion as a sol or as a fine powder. For additional details regarding such zirconium and ceria additions, see PCT Application No. PCT/US93/08988 having International Publication No. WO 94/07809, published Apr. 14, 1994, the disclosure of which is incorporated herein by reference.

The gel or partially dewatered gel can be shaped or crushed into irregularly shaped grain precursor. Irregularly shaped sintered abrasive grain are conveniently provided, for example, by crashing dried gel to the desired particle size. Conventional crushing means include roll crushing, ball milling, and hammer milling. To provide sintered abrasive grain in the shape of, for example, a rod, triangle, pyramid, disk, diamond, cone, or similar shape, shaping of the gel may be accomplished by conventional means such as pressing, molding, casting, extruding or cutting, or some combination of those steps, with drying.

Rods have an aspect ratio (i.e., length to width) from about one to one, and can have an aspect ratio of three to one, five to one, and greater. Methods of producing rod or filament shaped grain are taught, for example, in U.S. Pat. No. 5,090,968 (Pellow), the disclosure of which is incorporated herein by reference. Triangles, squares, or other grain having generally planar faces separated by a thickness, typically have a ratio of the shortest facial dimension to the thickness of the particle of about one to one, two to one, six to one, and greater. Such shaped abrasive grain are taught, for example, in U.S. Pat. No. 5,201,916 (Berg et al.) and U.S. Pat. No. 5,366,523 (Rowenhorst et al.), the disclosures of which are incorporated herein by reference.

Air drying steps may be used to remove water from either the shaped or unshaped gel. Drying can be accomplished, for example, in a forced air oven at a temperature within a range of about 50°–200° C., preferably, about 100°–1500° C. Generally, drying is conducted until the dried gel contains about 1–40 wt-%, preferably, about 5–20 wt-%, free water.

The dried gel is typically calcined to further remove water and/or solvent. During calcining, the dried gel is generally heated to a temperature of about 400°–1000° C., preferably about 400°–800° C. The dried gel is held within this temperature range until the free water and, preferably, over 90 wt-% of any bound volatiles are removed. If the dried gel contains a modifier precursor, the dried gel is preferably calcined for a period of time sufficient to achieve essentially complete conversion of the modifier precursor to metal oxide. If desired, the dried abrasive grain precursor can be subjected to microwave energy for calcining prior to sintering. In this embodiment, the microwave apparatus, which is discussed in greater detail below, includes venting means for venting the volatile components. These calcined materials can then be subjected to microwave sintering, with or without further processing, to improve their physical properties.

Impregnation of the Abrasive Grain Precursor with Modifier Material

To improve physical properties of the sintered alpha alumina-based ceramic abrasive grain (e.g., to increase the density, hardness, and/or toughness), the calcined abrasive grain precursor can be impregnated with various modifying materials. Alternatively, prior to calcining, the dried alpha alumina-based abrasive grain precursor can be impregnated with various modifying materials. General methods of impregnating grain from dried alumina hydrate dispersions are described, for example, in U.S. Pat. No. 5,164,348 (Wood), the disclosure of which is incorporated herein by reference.

In general, the alpha alumina-based abrasive grain precursor (which can be calcined or simply dried, uncalcined material) is porous. For example, calcined alpha alumina-based abrasive grain precursor generally has pores about 5–10 nanometers in diameter extending therein from an outer surface. Impregnation of the pores with an impregnation composition that includes an appropriate modifier precursor and a liquid medium provides for increases in density and can improve toughness of the sintered alpha alumina-based abrasive grain. The modifier for impregnation (i.e., the impregnate) generally is a precursor of a metal oxide provided in the form of one or more salts of a metal (e.g., a nitrate or acetate salt). The metal salt material is dissolved in a liquid medium, and the resulting solution is then mixed with the porous alpha alumina-based abrasive grain precursor. The impregnation process is thought to occur through capillary action. The capillary action can be improved by subjecting the porous alpha alumina-based abrasive grain precursor to vacuum treatment before the mixing step.

The liquid medium used for the impregnating composition is preferably water (including deionized water) and/or an organic solvent (preferably a nonpolar solvent). If the alpha alumina-based abrasive grain precursor is calcined prior to the impregnation step, water is the preferred liquid medium for the impregnation composition. If the abrasive grain precursor is not calcined prior to the impregnation step, the liquid medium preferred is one that will not dissolve or soften the grain.

The concentration of the salt in the liquid medium is typically, on an oxide basis, about 5–40% dissolved solids. In general, there should be at least about 50 ml of solution added to achieve impregnation of 100 grams of porous alpha alumina-based grain precursor, and, preferably, at least about 60 ml of solution to 100 grams of the grain.

In some instances, more than one impregnation step may be utilized. The same impregnation composition may be applied in repeated treatments, or subsequent impregnation compositions may contain different concentrations of the same salts or different salts or different combinations of salts.

During heat treatment of the impregnated alpha alumina-based abrasive grain precursor to form the sintered alpha alumina-based ceramic abrasive grain, the impregnate (or modifier) may react with alumina to form a reaction product. For example, the oxides of cobalt, nickel, zinc, and magnesium typically react with alumina to form an oxide having a spinel structure. Yttria typically reacts with alumina to form $3Y_2O_3 \cdot 5Al_2O_3$, having a garnet crystal structure. Praseodymium, samarium, ytterbium, neodymium, lanthanum, gadolinium, cerium, dysprosium, erbium, and mixtures of two or more of these rare earth metals typically react with alumina to form garnet, beta alumina, or phases exhibiting a perovskite structure. Certain rare earth oxides and divalent metal oxides react with alumina to form a rare earth aluminate represented by the formula $LmMAl_{11}O_{19}$, wherein Lm is a trivalent metal ion such as La, Nd, Ce, Pr, Sm, Gd, or Eu, and M is a divalent metal cation such as Mg, Mn, Ni, Zn, Fe, or Co. Such rare earth aluminates typically have a hexagonal crystal structure that is sometimes referred to as a magnetoplumbite crystal structure. Hexagonal rare earth aluminates have exceptional properties in an abrasive particle and, if present, are typically within the abrasive particle as a whisker(s) or platelet(s). Such whiskers or platelets typically have a length of about 0.5 micrometer to about 1 micrometer, and a thickness of about 0.5 micrometer or less. It is believed that the whiskers or platelets may inhibit crack propagation. These whiskers or platelets are more likely to occur in the absence of a nucleating agent.

Metal Oxide Surface Coatings

It is within the scope of the present invention to use alpha alumina-based ceramic abrasive grain precursor, as described above, which has preferably, at least about 70%, and more preferably, at least about 80%, of the outer surface of the core abrasive particle coated with a metal oxide. The metal oxide coating can be continuous or discontinuous. It can be fairly dense with no porosity, or it can be porous. The thickness of the metal oxide coating is preferably about 0.05–20 micrometers, and more preferably, about 0.1–10 micrometers.

Suitable metal oxides include oxides of titanium, zirconium, aluminum, chromium, vanadium, tantalum, hafnium, niobium, and combinations thereof. For purposes of the present application, metal oxide is also intended to refer to silicon oxide. Various metal oxide coatings useful for this invention are described below, although the scope of this invention is not limited to these embodiments.

A preferred metal oxide coating is taught by PCT Application No. PCT/US93/06689 having International Publication No. WO 94/02560, published Feb. 3, 1994, the disclosure of which is incorporated herein by reference. Celikkaya teaches the coating of oxides onto the outer surface of alumina particles by coating unsintered, dried or calcined alpha alumina-based ceramic abrasive particles with organometallic oxide precursors (i.e., alkoxides), which then react with the water within the abrasive grain precursor to form the oxide coating. In general, the conversion is conducted through steps of hydrolysis to form metal hydroxide (s) and then reaction, to form metal oxide. The product, from the step of converting the metal alkoxide-containing coating on the core abrasive particles to a metal oxide coating, is then microwave sintered under conditions sufficient to provide sintered alpha alumina-based ceramic abrasive grain having a metal oxide coating autogenously bonded thereto.

A variety of materials may be utilized as the metal alkoxide, in the metal alkoxide-containing coating. For example, zirconium will be preferred for certain applications (i.e., those in which the abrasive grain are to be utilized for stainless steel grinding). However, in some applications alkoxides of titanium, aluminum, magnesium, zinc, cobalt, nickel, silicon, hafnium, iron, manganese, chromium, yttrium, praseodymium, samarium, ytterbium, neodymium, lanthanum, gadolinium, cerium, dysprosium, erbium, and mixtures of two or more thereof may be desired. The following is a preferred formula for the metal alkoxides:

$$Z_xM(OR)_{n-x}$$

wherein: M is a metal cation; n is the oxidation state of M; x is an integer having a value of 0 to n−1; OR is an alkoxy group, wherein O is oxygen and each R group is an alkyl group; and, each Z group is independently an organic group or inorganic group.

In general, what is required is an alkoxide which is a precursor to a metal hydroxide and metal oxide as described above. A variety of alkoxides, having a variety of R groups therein may be utilized. That is, the R group may be of a variety of formulae. In general, each R group has an organic group of 1–20 carbon atoms, preferably 3–6 carbon atoms. Since in typical processes according to the present invention the alkoxy group yields a by-product (i.e., an alcohol), relatively simple (non-substituted, 3–6 carbon atoms) organic groups are preferred. If the metal alkoxide includes more than one alkoxy group thereon, each alkoxy group may be the same or selected independently of other alkoxy groups in the material.

The metal atom may include one or more organic or inorganic groups bonded directly thereto. As with the organic groups in the alkoxy groups, there is no specific limitation on the nature of any organic group or inorganic group bonded directly to the metal, except that it be non-interfering with formation of a desired coating. If the metal atom includes more than one inorganic or organic group thereon, each may be the same or selected independently of the others. The metal atom may include both organic and inorganic groups thereon.

Preferably, sufficient metal alkoxide-containing coating is provided on the abrasive grain precursor to yield a final free flowing, sintered alpha alumina-based ceramic abrasive grain having a metal oxide coating covering at least 70% of the outer surface area thereof.

Particulate Metal Oxide Surface Coatings

A coating of inorganic metal oxide particulates on the abrasive grain precursor provides sintered abrasive grain having an increased surface area for improved adhesion to the bond system. Preferably, the particulate metal oxide coating on the sintered abrasive grain (or abrasive core) is relatively porous.

Preferably, at least about 70% (more preferably, at least about 80%) of the surface area of the sintered alpha alumina-based particle (or core) is covered with the inorganic metal oxide particulate coating, although greater than about 90% coverage may be obtained. With respect to the amount of coverage, reference is made to the amount of exposed sintered particle (core) surface in the resulting coated abrasive grain. Thus, coverage of at least about 70% means that no more than about 30% of the total area of the underlying sintered base particle surface is exposed (i.e., not covered with particulates). The amount of coverage in this context is not meant to refer to the nature (e.g., porosity or density) of the particulate coating. The coating can be continuous or discontinuous.

During microwave sintering, the inorganic metal oxide particulates in the coating typically sinter to one another and to the core abrasive particle resulting in a coating having good structural integrity. The resulting coating may contain more than one layer of inorganic metal oxide particulates. Typically, there are 2 to 30 layers, more typically, 3 to 20 layers of particulates. Preferably, at least 5 to 15 layers of inorganic metal oxide particulates are provided, stacked on one another.

The inorganic metal oxide particulates can comprise, for example, transitional alumina, alpha alumina, hydrated aluminas, yttria, magnesia, rare earth metal oxides, zinc oxide, iron oxide, silicates, chromium oxide, titanium oxide, nickel oxide, alumina, garnet, hexagonal rare earth aluminate, alumina-zirconia, zirconium oxide, alumina oxynitride, silicon aluminum oxynitride, silicon aluminum oxycarbide, and combinations thereof.

U.S. Pat. No. 5,011,508 (Wald et al.), the disclosure of which is incorporated herein by reference, describes autogenously bonding fine inorganic metal oxide (e.g., alumina) particulates to the surface of a calcined base particle and then sintering to provide abrasive grain having a particulate metal oxide coating. A preferred metal oxide particulate surface coating is described in U.S. Pat. No. 5,213,591 (Celikkaya et al.), the disclosure of which is incorporated herein by reference. More specifically, Celikkaya et al. teach an alpha alumina-based ceramic abrasive grain comprising an alpha alumina-based core having a coating of inorganic metal oxide particulates autogenously bonded thereto.

In one preferred process, a coating composition that includes inorganic metal oxide particulates and a liquid medium (e.g., water or an organic solvent) is applied (or coated) to the calcined or uncalcined (i.e., dried gel) abrasive grain precursor. Generally, if the liquid medium is water or a polar organic solvent, the abrasive grain precursor should be calcined before applying the coating. If, however, the liquid medium is a nonpolar organic solvent, it is not necessary to calcine the abrasive grain precursor prior to coating.

Generally, the coating composition includes about 0.01–20 wt-%, preferably, about 0.1–5 wt-% of inorganic metal oxide particulates, wherein the weight percentage is based on the weight of particulate, plus carrier liquid (water, acetone, etc.), without regard to other additives or adjuvants. The coating composition may include adjuvants such as wetting agents or dispersing agents, typically in mounts effective to provide the properties desired to the mixture or dispersion. The coating composition, which typically is a suspension, may be formed using conventional means, such as mixing with a continuous mixer, batch mixer, ball mill, cement mixer, a vibrator, or a tumbler.

The coating composition can be applied, for example, by mixing abrasive grain precursor with the coating composition. Suitable mixing techniques include those using a screw auger, a batch mixer, a continuous mixer, a cement mixer, a vibrator, or a tumbler. One preferred technique is to feed the coating composition and abrasive grain precursor into a continuous mixer from individual feed streams.

To provide a substantially uniform coating of inorganic metal oxide particulates on the abrasive grain precursor, a minimum ratio of volume of carrier liquid to weight of abrasive grain precursor to be coated is preferred. Generally, at least 50 ml of liquid volume is the minimum preferred in order to ensure good inorganic metal oxide particulate coating of 100 grams of abrasive grain precursor. Preferably, about a 20% excess of liquid volume over this amount (i.e., 60 ml liquid per 100 grams of grain precursor) is desirable to ensure good coating and processing. It is noted that this ratio is the same ratio presented hereinabove for preferred impregnation of the abrasive grain precursor.

Following coating, the coated abrasive grain precursor is dried such that individual abrasive grain precursor does not stick together. It is foreseen that, in typical applications, the coated abrasive grain precursor is dried by forced air drying at temperatures of about 100°–1500° C. Preferably, excess liquid is removed, for example, by decanting prior to drying.

If the abrasive grain precursor is mixed with a liquid medium which contains modifier precursor (as described above), while at the same time having inorganic metal oxide particulates (as described above) suspended therein, both impregnation and inorganic metal oxide particulate coating can result simultaneously.

Microwave Sintering

The free flowing, calcined alpha alumina-based abrasive grain precursor can be microwave sintered on a batch or a continuous basis. This process involves generating microwaves under conditions effective to couple with, and sinter calcined alpha alumina-based abrasive grain precursor at a temperature of at least about 1150° C. Generally, the free flowing, sol-gel derived calcined alpha alumina-based ceramic abrasive grain precursor is heated to a temperature sufficient to couple with (i.e., to absorb), the microwaves generated from a microwave sintering apparatus. The temperature at which coupling occurs depends on the composition of the abrasive grain precursor. For example, for an alumina-based abrasive grain precursor, coupling typically occurs at a temperature at least about 500° C. When the alpha alumina-based material is at the appropriate temperature such that it will couple with the microwaves, the microwaves penetrate the material and heat it internally and volumetrically to a desired sintering temperature, which typically depends on the composition of the abrasive grain precursor.

The microwaves are generated by a microwave sintering apparatus comprising a cavity, in which is placed free flowing, sol-gel derived, calcined alpha alumina-based ceramic abrasive grain precursor, a microwave generator for generating microwaves and directing them into the cavity, and a microwave power supply for powering the microwave generator. This apparatus can include a fixed microwave chamber for batch processing or a rotary tube furnace for continuous processing, for example. Alternatively, if desired, a batch process could be carried out in a fluidized bed for greater uniformity in sintering.

Microwaves typically are within a frequency band of 300 MHz to 300 GHz. Industrial microwave processing systems are typically operated at 915 MHz, 2.45 GHz, 5.8 GHz, and 24.1 GHz. Although these are currently the frequencies available in commercial use, other frequencies could be used for the method of the present invention. A preferred source of microwave radiation is the microwave furnace described in "Microwave Sintering of Multiple Alumina and Composite Components," J. D. Katz and R. D. Blake, *Am. Ceram. Soc. Bull.*, 70, 1304–1308 (1991), the disclosure of which is incorporated by reference herein. However, other microwave generating sources capable of generating the requisite radiation are also permissible.

Once the calcined abrasive grain precursor is at an effective coupling temperature, it is heated to, and held within, a sintering temperature range of preferably about 1150°–1600° C., more preferably, within a range of about 1250°–1450° C., for a time sufficient to transform transitional alumina(s) to alpha alumina, to cause metal oxide modifier precursors to either react with the alumina or form metal oxide, and to allow the material to densify to at least about 85% (preferably, at least about 90%, and more preferably, at least about 95%) of theoretical. Advantageously, depending on the composition of the grain, the sintering temperature using microwaves to provide abrasive grain is generally about 100° C. lower than the temperature used in conventional sintering operations, such as gas firing and resistance heating. The length of time that the calcined abrasive grain precursor is held within the desired sintering temperature range depends on various factors, such as particle size, composition of the abrasive grain precursor, and sintering temperature. Typically, no greater than about 60 minutes are needed to produce useful sintered grain. That is, no greater than about 60 minutes at the desired sintering temperature is necessary to produce sintered alpha alumina-based ceramic abrasive grain having a density of at least about 85% of the theoretical and a hardness of at least about 16 GPa. At the end of this period of time, the microwave generator is turned off, allowing for the sintered abrasive grain to cool.

The abrasive grain precursor can be heated to a temperature at which microwaves will couple with it prior to placing it in the cavity of the microwave sintering apparatus and/or while in the cavity. For example, the abrasive grain precursor can be heated while in the microwave cavity if the microwave sintering apparatus is also equipped with a heating system from a conventional oven, a convection oven, or the like. For a useful "hybrid" microwave/conventional resistance furnace, see, for example, U.S. Pat. No. 5,191,183 (Balbaa et al.), which is incorporated herein by reference. Alternatively, and preferably, the abrasive grain precursor can be heated while in the microwave cavity by transmission of thermal energy from an auxiliary susceptor material that absorbs microwaves at a temperature lower than does the abrasive grain precursor. The auxiliary susceptor material typically couples with microwaves until the calcined abrasive grain precursor reaches a temperature at which it will preferentially couple with the microwaves. At this point, there is "crossover" from a mechanism wherein the microwaves primarily couple with the auxiliary susceptor material to a mechanism wherein the microwaves primarily couple with the alpha alumina-based abrasive grain precursor.

Thus, the method of the present invention provides free flowing, sintered alpha alumina-based ceramic abrasive grain by providing a sol-gel derived free flowing, calcined alpha alumina-based ceramic abrasive grain precursor in the cavity of the microwave sintering apparatus; and generating microwaves under conditions effective to couple the microwaves with the calcined abrasive grain precursor and sinter it at a temperature of at least about 1150° C. to provide free flowing, sintered alpha alumina-based ceramic abrasive grain having a density of at least about 85% of theoretical and a hardness of at least about 16 GPa. As used herein, "under conditions effective to couple with the calcined abrasive grain precursor" means that the calcined abrasive grain precursor is of a sufficient temperature to couple with the microwaves at a level effective to raise the temperature of the calcined abrasive grain precursor to an effective sintering temperature. Typically, effective coupling begins when calcined alpha alumina-based ceramic abrasive grain precursor is at a temperature of about 500° C.

As the microwaves couple with the calcined alpha alumina-based abrasive grain precursor, the temperature of the calcined abrasive grain precursor increases to a temperature at which sintering occurs. Typically, for calcined alpha alumina-based abrasive grain precursor, this occurs when the abrasive grain precursor reaches a temperature of about 1150° C. Thus, as used herein, "under conditions effective to sinter the calcined abrasive grain precursor" means that the calcined abrasive grain precursor is at a temperature of at least about 1150° C. Using the methods of the present invention, the time it takes for the temperature of the calcined alpha alumina-based abrasive grain precursor to reach the sintering temperature from a temperature of about 500° C. is preferably no greater than about 60 minutes. Once the temperature of the calcined abrasive grain precursor reaches the sintering temperature, no greater than about 60 minutes is needed for effective sintering. More preferably, however, no greater than about 60 minutes is needed to both raise the temperature of the calcined abrasive grain precursor to the desired sintering temperature and to effectively sinter the calcined abrasive grain precursor. That is, the time from the initiation of coupling microwaves with the calcined abrasive grain precursor (i.e., at a temperature of at least about 500° C. or alpha-alumina based systems) to the completion of sintering (i.e., when effectively sintered abrasive grain is produced) is no greater than about 60 minutes. This can be accomplished in a significantly shorter period of time if the calcined abrasive grain precursor is preheated and coupling begins immediately upon generating the microwaves. Effectively sintered abrasive grain has a density of at least about 85% of theoretical and a hardness of at least about 16 GPa. Preferably, effectively sintered alpha alumina-based ceramic abrasive grain has an average alpha alumina crystallite size of no greater than about 5 micrometers, and more preferably, no greater than about 1 micrometer.

Although the inventors do not wish to be bound by theory, it is believed that the sintered abrasive grain remains free flowing because of the short period of time required to increase the temperature of the abrasive grain precursor to an effective sintering temperature and to sinter it. Thus, the method of the present invention is particularly desirable because it can be carried out in a relatively short period of time, and the sintering can be carried out in one step. For certain embodiments, the calcining and sintering can be done in one step if the microwave apparatus is appropriately vented. In contrast, the microwave process described in U.S. Pat. No. 5,302,564 (Winkler et al.), which involves several stages, some of which are carried out under high gas pressures, involves a total sintering time on the order of several hours.

If the microwave susceptibility (i.e., ability to couple with microwaves) of the specific sample of grain being processed is low (i.e., it does not absorb much microwave energy) at room temperature (i.e., 20°–30° C.), an auxiliary susceptor material may be placed in the cavity with the abrasive grain precursor. This auxiliary susceptor material can serve to couple initially with the microwaves and thereby help heat the abrasive grain precursor indirectly until a crossover point is reached, at which time the abrasive grain precursor directly couples with (i.e., absorbs) the microwaves. For effective transfer of thermal energy between the auxiliary susceptor material and the abrasive grain precursor, they are in close proximity, preferably they are touching. The auxiliary susceptor material may also assist in providing efficient heat transfer such that the thermal gradients within any one sample of grain is reduced. That is, the temperature of the grain is substantially uniform throughout the sample.

Suitable auxiliary susceptor materials are able to withstand high temperatures (e.g., at least about 1600° C.) and rapid temperature changes experienced under the conditions of operation, and to resist degradation and thermal shock. Furthermore, they are able to absorb a substantial amount of microwave energy at temperatures below that at which the abrasive grain precursor couples with the microwave energy. Preferably, they are able to absorb a substantial amount of microwave energy at room temperature. Because it is advantageous to carry out the sintering in air, the auxiliary materials preferably do not react with oxygen within the temperature range of sintering. Furthermore, the auxiliary susceptor materials preferably do not react with the abrasive grain precursor or the sintered abrasive grain. Examples of suitable materials include ceramic materials, such as silicon carbide, zirconia, and molybdenum disilicide. Generally, zirconia is preferred because it does not react with the abrasive grain precursor or the sintered abrasive grain. Therefore, the abrasive grain can be in direct contact with zirconia during processing.

The auxiliary susceptor material can be in a variety of shapes and densities. For example, it can be in the form of cylindrical rods, spheres, blocks, etc. Alternatively, it can be in the form of a closed container (e.g., a box) in which the abrasive grain precursor is placed. A closed container such as a box is particularly advantageous because it can contain the thermal energy and create a "hot zone" therein. Thus, auxiliary susceptor materials suitable for use in forming the closed container are also thermal insulators such that when microwaves pass through and heat the abrasive grain, the thermal energy being emitted from the abrasive grain is retained inside the container. Good thermal insulating materials are typically fibrous, low density materials. Suitable low density structures can be formed, for example, from powders, spheroids, granules, and/or fibers (e.g., zirconia fibers stabilized with, for example, yttria, magnesia, and/or calcia). An example of such a structure is fibrous zirconia board, which is available, for example, from Zircar Products Inc., Florida, N.Y., under the trade designation "Type ZYFB-3" yttria-stabilized zirconia.

Referring to FIG. 1, microwave sintering apparatus 100 includes microwave furnace 120 with cavity 140 containing box 160 of an auxiliary susceptor material equipped with sapphire lightpipe temperature probe 180, which is connected to a temperature readout device 190, for monitoring the temperature of the grain. Box 160 is held together by a ceramic rope 170 and rests on insulating bottom support 200. Contained in box 160 is abrasive grain precursor 220. Although this is one preferred arrangement of the auxiliary susceptor material and the abrasive grain, one of skill in the art will recognize that there are numerous possibilities.

In one preferred method according to the present invention that uses a zirconia box containing alumina-based abrasive grain precursor at a temperature of less than about 500° C., the microwaves initially couple to the zirconia box, which is more dielectrically lossy (i.e., it absorbs microwave energy more effectively) than the abrasive grain precursor at a temperature of about 25°–500° C. As the zirconia box heats up, it transfers its thermal energy to the abrasive grain precursor, thereby indirectly heating the abrasive grain precursor. As the abrasive grain precursor continues to heat up, it become more dielectrically lossy, such that when a crossover point is reached, the microwaves are preferentially absorbed by the abrasive grain rather than the box. By increasing the power to the microwave generator, the temperature of the abrasive grain can be rapidly increased, while the temperature of the zirconia box decreases.

Alternatively, a container can be used that is not made out of an auxiliary susceptor material and the auxiliary susceptor material can be placed in close proximity to the abrasive grain precursor contained therein. For example, a box can be made of fibrous alumina board with silicon carbide rods outside the box, within the walls of the box, or outside the box and wedged between it and a larger box. To avoid localized heating and/or reactivity with the silicon carbide, preferably the abrasive grain precursor should not be in direct contact with silicon carbide (i.e., touching it). If desired, a fibrous alumina box may also be used as an insulator around the outside of the zirconia box discussed above.

It is desirable for economic reasons (with respect to production and cost, for example) to use a low sintering temperature, as well as a fast heating rate to the sintering temperature, and a relatively short hold time at that temperature to yield abrasive grain that are uniformly sintered, approach theoretical density, and have a fine microstructure. Alternatively, for certain compositions, a slow or a medium heating rate can be used provided the hold times are short and/or a lower sintering temperature is chosen. If the sintering temperature chosen is too high, the heating rate is too slow, and/or the hold time too long, the resulting microwave-sintered alpha alumina-based ceramic abrasive grain may exhibit excessive crystallite growth. Excessive crystallite growth (i.e., larger than about 5 micrometers) is undesirable, as the resultant abrasive grain tends to exhibit reduced grinding performance. Heating rate can be controlled by varying the applied microwave power in the temperature range over which the abrasive grain precursor is sufficiently microwave susceptible. The preferred heating rate, optimum sintering temperature, and hold time at that temperature depend, for example, on the composition of each particular type of abrasive grain precursor and need to be determined empirically. One of skill in the art can determine these conditions with relatively little experimentation.

The microwave sintering method according to the present invention is advantageous over conventional sintering because it requires shorter sintering times (i.e., no greater than about 60 minutes), generally lower sintering temperatures (e.g., about 100° C. lower than optimum conventional sintering temperatures), and lower energy consumption. Furthermore, it can be carried out in one step (i.e., heating without intervening cooling stages). In addition to sintering, this one step can also include calcining if the microwave apparatus is appropriately vented. Also, the method according to the present invention is advantageous because it can be carried out under ambient pressure and without the need for control of the atmosphere. That is, the method according to the present invention can be carried out in air.

Alpha Alumina-Based Ceramic Abrasive Grain

Alpha alumina-based ceramic abrasive grain prepared according to the method of the present invention have a density of at least about 85% (preferably at least about 90%, more preferably, at least about 95%, and most preferably, at least about 97%) of theoretical. The sintered abrasive grain have an average hardness of at least about 16 GPa (preferably, at least about 18 GPa, and more preferably, at least about 20 GPa), and a toughness of at least about 2.0 MPa·m$^{1/2}$ (preferably, at least about 2.5 MPa·m$^{1/2}$, and more preferably, at least about 3.0 MPa·m$^{1/2}$). The abrasive grain typically have a particle size (i.e., the longest dimension of the abrasive grain) of at least about 10 micrometers, and often at least about 20 micrometers. The abrasive grain described herein can be readily made with a particle size of greater than about 100 micrometers. Typically, the particle size of the abrasive grain is less than about 4000 micrometers, and often less than about 2000 micrometers. The particle sizes referred to herein are typically average abrasive grain sizes, although, preferably, for a sample that is said to have "greater than" a particular particle size, substantially all the particle of the sample is greater than that particular value.

In a preferred aspect of the invention, the microstructure of the sintered abrasive grain can be described as polycrystalline consisting of randomly oriented alpha alumina crystallites having an average diameter of less than about 5 micrometers, preferably less than about 1 micrometer. In some cases, the microstructure of the abrasive grain may contain "cells" that include submicron alpha alumina crystallites having similar crystallographic orientations. The crystallite orientation will vary from one cell to another, but will generally be the same within the cell. Such cells may be up to 15 micrometers in diameter. Preferably, however, such cells are less than about 5 micrometers in diameter. If metal oxide modifiers are present, the microstructure of the abrasive grain also includes metal oxide crystals, or the crystals of a reaction product of metal oxide and alumina. The crystals of metal oxide modifiers or the product phases of the reaction between the metal oxide and alumina may be in a variety of shapes or sizes such as whiskers, plates, or spheres, and may be distributed in or around alpha alumina crystallites or cells.

Abrasive Products

Abrasive grain made according to the method of the present invention can be used in a variety of abrasive products, such as coated abrasive products (including structured abrasives, lapping films, and the like), bonded abrasive products (including grinding wheels, cutoff wheels, and honing stones), nonwoven abrasive products, and abrasive brushes. Typically, abrasive products (i.e., abrasive articles) include a binder and abrasive grain, at least a portion of which are the abrasive grain made according to the method of the invention secured within the abrasive product by the binder. Methods of making such abrasive products are well known to those skilled in the art. Furthermore, abrasive grain made according to the present invention, can be used in abrasive applications that utilize slurries of abrading compounds (e.g., polishing compounds).

Coated abrasive products generally include a backing, abrasive grain, and at least one binder to hold the abrasive grain on the backing. The backing can be any suitable material, including cloth, polymeric film, fiber, nonwoven webs, paper, combinations thereof, and treated versions thereof. The binder can be any suitable binder including an inorganic or organic binder. Bonded abrasive products typically include a shaped mass of abrasive grain held together by an organic, metallic, or vitrified binder. Such shaped mass can be, for example, in the form of a wheel, such as a grinding wheel, or a cutoff wheel. It can also be in the form, for example, of a honing stone or other conventional bonded abrasive shape. Nonwoven abrasive products typically include an open porous lofty polymer filament structure having abrasive grain distributed throughout the structure and adherently bonded therein by an organic binder. Examples of filaments include polyester fibers, polyamide fibers, and polyaramid fibers.

Suitable organic binders for the abrasive products according to the present invention include thermosetting organic polymers. Examples of suitable thermosetting organic polymers include phenolic resins, urea-formaldehyde resins, melamine-formaldehyde resins, urethane resins, acrylate resins, polyester resins, aminoplast resins having pendant α,β-unsaturated carbonyl groups, epoxy resins, and combinations thereof. The binder and/or abrasive product can also include additives such as fibers, lubricants, wetting agents, thixotropic materials, surfactants, pigments, dyes, antistatic agents (e.g., carbon black, vanadium oxide, graphite, etc.), coupling agents (e.g., silanes, titanates, zircoaluminates, etc.), plasticizers, suspending agents, and the like. The amounts of these optional additives are selected to provide the desired properties. The coupling agents can improve adhesion to the abrasive grain and/or the filler.

The binder can also contain filler materials or grinding aids, typically in the form of a particulate material. Typically, the particulate materials are inorganic materials. Examples of particulate materials that act as fillers include metal carbonates, silica, silicates, metal sulfates, metal oxides, and the like. Examples of particulate materials that act as grinding aids include: halide salts such as sodium chloride, potassium chloride, sodium cryolite, and potassium tetrafluoroborate; metals such, as tin, lead, bismuth, cobalt, antimony, iron, and titanium; organic halides such as polyvinyl chloride and tetrachloronaphthalene; sulfur and sulfur compounds; graphite; and the like. A grinding aid is a material that has a significant effect on the chemical and physical processes of abrading, which results in improved performance. In a coated abrasive product, a grinding aid is typically used in the supersize coat applied over the surface of the abrasive grain, although it can also be added to the size coat. Typically, if desired, a grinding aid is used in an amount of about 50–300 g/m$^2$ (preferably, about 80–100 g/m$^2$) of coated abrasive product.

Abrasive grain made according to the method of the present invention, can include a surface coating. Surface coatings are known to improve the adhesion between the abrasive grain and the binder in abrasive products, and in some cases to improve the abrading properties of the abrasive grain. Such surface coatings are, for example, described in U.S. Pat. No. 5,011,508 (Wald et al.), U.S. Pat. No. 5,009,675 (Kunz et al.), U.S. Pat. No. 4,997,461 (Markhoff-Matheny et al.), U.S. Pat. No. 5,213,951 (Celikkaya et al.), U.S. Pat. No. 5,085,671 (Martin et al.), and U.S. Pat. No. 5,042,991 (Kunz et al.), the disclosures of which are incorporated herein by reference.

The abrasive products can contain 100% abrasive grain made according to the method of the present invention or they can contain a blend of such abrasive grain with conventional abrasive particles and/or diluent particles. However, at least about 15% by weight, and preferably about 50–100% by weight, of the abrasive grain in the abrasive products should be abrasive grain made according to the method of the present invention. Examples of suitable conventional abrasive grain include fused aluminum oxide, silicon carbide, garnet, fused alumina zirconia, and sol-gel derived abrasive grain. Examples of suitable diluent particles include marble, gypsum, flint, silica, iron oxide, aluminum silicate, glass, metal oxide bubbles, hollow clay spheres, porous clay pellets, solid or hollow glass spheres, expanded siliceous materials, hollow or solid resin spheres, and diluent agglomerates. Abrasive grain made according to the method of the present invention can also be combined in or with abrasive agglomerates. An example of an abrasive agglomerate is described in U.S. Pat. No. 4,311,489 (Kressner), U.S. Pat. No. 4,652,275 (Bloecher et al.), and U.S. Pat. No. 4,799,939 (Bloecher et al.), the disclosures of which are incorporated herein by reference.

EXAMPLES

Objects and advantages of this invention are further illustrated by the following examples, but the particular materials and amounts thereof recited in these examples, as well as other conditions and details, should not be construed to unduly limit this invention. All parts and percentages are by weight unless otherwise indicated. The microwave-sintered grain were characterized to determine density, average grain size, and grinding performance.

General Procedure I for Making Abrasive Grain Precursor

An alumina-based dispersion was made by combining 28.5 parts boehmite (alpha alumina monohydrate) commercially available from Condea Chemical under the trade designation "DISPERAL," 69.8 parts deionized water, and 2.3 parts nitric acid. The dispersion, or sol, was subsequently gelled. The gelled dispersion was placed into "PYREX" glass trays and dried overnight in a conventional oven at 93° C. to a friable solid. The resulting dried material was crashed with a pulverizer (type U.A., manufactured by BRAUN Corp., Los Angeles, Calif.) having a 1.1 mm gap between the steel plates, which is available from Braun Corp., Los Angeles, Calif. The resulting abrasive grain precursor was sized and the fraction that passed through a screen having 2 mm openings but was retained on a screen having 0.125 mm openings was fed into a rotary kiln to provide prefired (calcined) grain. The rotary kiln was a stainless steel tube (15 cm in diameter and 1.2 m in length) with a 50 cm hot zone. The hot zone peak temperature was 650°–750° C. The tube was inclined at a 2.4 degree angle with respect to the horizontal and rotated at about 5 revolutions per minute (rpm), to provide a residence time of about 1 minute in the hot zone.

General Procedure II for Making Abrasive Grain Precursor

Calcined abrasive grain precursor was prepared as described in the "General Procedure I for Making Abrasive Grain Precursor." Subsequently, an impregnation mixture was prepared by mixing together an impregnating liquid and a metal oxide precursor, as described in each particular example. The impregnation mixture and the calcined abrasive grain precursor were thoroughly mixed together at a ratio of approximately 100 grams of abrasive grain precursor to 60 milliliters of impregnation mixture such that the majority of the impregnation mixture penetrated into the pores of the calcined material. The impregnated material was partially dried with a blow drier and calcined for a second time under the same conditions as described in the "General Procedure I for Making Abrasive Grain Precursor."

Abrasive Grain Precursor I

Abrasive Grain Precursor I was prepared according to the "General Procedure I for Making Abrasive Grain Precursor" except that 5.3 parts of an aqueous dispersion (pH 5.0–5.5) containing 4% iron oxide (calculated on the theoretical oxide basis as $Fe_2O_3$), about 90–95% of which is lepidocrocite, acicular particles with an average particle size of about 0.05–0.1 micrometer, was added to the alumina-based dispersion. The resulting calcined abrasive grain precursor, which was reddish-brown in color, contained, on a theoretical oxide basis, approximately 99% $Al_2O_3$ and approximately 1% $Fe_2O_3$.

Abrasive Grain Precursor II

Abrasive Grain Precursor II was prepared according to the "General Procedure II for Making Abrasive Grain Precursor." An impregnation mixture was prepared by combining an aqueous solution of lanthanum nitrate, neodymim nitrate, and yttrium nitrate (10.2% $La(NO_3)_3 \cdot 6H_2O$), 10.0% $Nd(NO_3)_3 \cdot 6H_2O$, 13.1% $Y(NO_3)_3 \cdot 6H_2O$), which are available from Molycorp of Lourviers, Colo., with a sufficient amount of an aqueous solution of magnesium nitrate (70% $Mg(NO_2)_3 \cdot 6H_2O$, which is available from Mallinckrodt Chemical of Paris, Ky.) and an aqueous solution of cobalt nitrate (73.8% $Co(NO_3)_2 \cdot 6H_2O$, which is available from Hail Chemical of Wickliffe, Ohio) and deionized water to provide a solution containing about 2.4% $La(NO_3)_3 \cdot 6H_2O$, about 2.4% $Nd(NO_3)_3 \cdot 6H_2O$, about 3.1% $Y(NO_3)_3 \cdot 6H_2O$, about 11.5% $Mg(NO_3)_2 \cdot 6H_2O$, about 0.4% $Co(NO_3)_2 \cdot 6H_2O$, in water. The calcined abrasive grain precursor was impregnated with the impregnation mixture and processed further as described in the "General Procedure II for Making Abrasive Grain Precursor." The resulting calcined abrasive grain precursor, which was blue in color, contained, on a theoretical oxide basis, approximately 95.2% $Al_2O_3$, approximately 1.2% MgO, approximately 1.2% $La_2O_3$, approximately 1.2% $Nd_2O_3$, approximately 1.2% $Y_2O_3$, and approximately 0.05% CoO.

Abrasive Grain Precursor III

Abrasive Grain Precursor III was prepared according to the "General Procedure II for Making Abrasive Grain Precursor," except that 5.3 parts of an aqueous dispersion (pH 5.0–5.5) containing 4% iron oxide (calculated on the theoretical oxide basis as $Fe_2O_3$), about 90–95% of which is lepidocrocite, acicular particles with an average particle size of about 0.05–0.1 micrometer, was added to the alumina-based dispersion. The calcined abrasive grain precursor was impregnated with a solution of 9% magnesium nitrate (calculated as MgO) in water, which is available from Mallinckrodt Chemical of Paris, Ky., and processed further as described in the "General Procedure II for Making Abrasive Grain Precursor." The resulting calcined abrasive grain precursor, which was reddish-brown in color, contained, on a theoretical oxide basis, approximately 94% $Al_2O_3$, approximately 5% MgO, and approximately 1% $Fe_2O_3$.

Abrasive Grain Precursor IV

Abrasive Grain Precursor IV was prepared according to the "General Procedure I for Making Abrasive Grain Precursor," except that 5.3 parts of an aqueous dispersion (pH 5.0–5.5) containing 4% iron oxide (calculated on the theoretical oxide basis as $Fe_2O_3$), about 90–95% of which is lepidocrocite, acicular particles with an average particle size of about 0.05–0.1 micrometer, was added to the alumina-based dispersion. Also, 5.4 parts of a 20% zirconia sol (calculated as $ZrO_2$) in water, which is available from Nyacol Products Inc., Ashland, Mass. under the trade designation "Zr 150/20," was added to the alumina-based dispersion. The resulting calcined abrasive grain precursor, which was reddish-brown in color, contained, on a theoretical oxide basis, approximately 94% $Al_2O_3$, approximately 5% $ZrO_2$, and approximately 1% $Fe_2O_3$.

Abrasive Grain Precursor V

Abrasive Grain Precursor V was prepared by the procedure outlined for the preparation of Abrasive Grain Precursor II, except 5.3 parts of an aqueous dispersion (pH 5.0–5.5) containing 4% iron oxide (calculated on the theoretical oxide basis as $Fe_2O_3$), about 90–95% of which is lepidocrocite, acicular particles with an average particle size of about 0.05–0.1 micrometer, was added to the alumina-based dispersion. The resulting calcined abrasive grain precursor, which was reddish-brown in color, contained, on a theoretical oxide basis, approximately 94.2% $Al_2O_3$, approximately 1.0% $Fe_2O_3$, approximately 1.2% MgO, approximately 1.2% $La_2O_3$, approximately 1.2% $Nd_2O_3$, approximately 1.2% $Y_2O_3$, and approximately 0.05% CoO.

Abrasive Grain Precursor VI

Abrasive Grain Precursor VI was prepared according to the "General Procedure II for Making Abrasive Grain Precursor," except that 5 parts of a slurry containing 10% alpha-alumina nucleating material was added to the alumina-based dispersion. This slurry was prepared by ball milling alpha-alumina particles (Alcoa "A16-SG") using alumina milling media (alumina rods from Coors, Golden, Colo.). The calcined abrasive grain precursor was impregnated with a solution of 9% magnesium nitrate (calculated as MgO) in water, which is available from Mallinckrodt Chemical of Paris, Ky., and processed further as described in the "General Procedure II for Making Abrasive Grain Precursor." The resulting calcined abrasive grain precursor, which was white in color, contained, on a theoretical oxide basis, approximately 94% $Al_2O_3$, and approximately 6% MgO.

Density

The apparent density of the sintered alpha alumina-based ceramic abrasive grain was measured with a helium gas pycnometer, which is available from Micromeritics Instrument Corp., Norcross, Ga. under the trade designation "Micromeritics AccuPyc 1330." The measured densities were recorded in grams/$cm^3$.

General Procedure for Making a Coated Abrasive Disc

Sintered alpha alumina-based ceramic abrasive grain were incorporated into coated abrasive discs for grinding performance evaluation. The coated abrasive discs were made according to generally used procedures. The sintered abrasive grain were screened again to adjust the grading of the control and the test abrasive grain. The abrasive grain were bonded to a vulcanized fiber backing (17.8 cm diameter disc, 0.82 mm thick, having a 2.2 cm center hole) using calcium carbonate-filled phenolic make resin (48% resole phenolic resin, 52% calcium carbonate, diluted to 81% solids with water and glycol ether) and a cryolite-filled phenolic size resin (32% resole phenolic resin, 2% iron oxide, 66% cryolite, diluted to 78% solids with water and glycol ether). The make resin was precured for 90 minutes at 88° C. and the size resin was precured for 90 minutes at 88° C. followed by a final cure of 10 hours at 100° C. The abrasive grain were electrostatically coated on the resin coated backing.

Grinding Test I

A coated abrasive disc was attached to a hard phenolic backup pad (16.5 cm in diameter and 1.57 mm in thickness), which was in turn mounted on a steel flange (15.2 cm in diameter). The test disc was rotated counter clockwise at 3,550 revolutions per minute (rpm) and placed into contact with the 1.8 mm peripheral edge of a 1018 carbon steel disc-shaped workpiece (25 cm in diameter) under a load of 2.9 kg. The workpiece was deployed at an angle of 7.5 degrees from a position normal to the abrasive disc and rotated counter clockwise at 2 rpm. The test was run for 12 minutes for each disc. At the end of the test and after every minute of grinding, the workpiece was weighed to determine the amount of metal abraded from the workpiece.

Grinding Test II

A coated abrasive disc was mounted on a beveled aluminum backup pad and used to grind the face of a 1018 mild steel workpiece (1.25 cm by 18 cm) or 304 stainless steel workpiece. The disc was driven at 5,500 rpm while the portion of the disc overlaying the beveled edge of the backup pad contacted the workpiece at a load of about 6 kg. Each disc was used to grind a separate workpiece for a one minute interval for a total time of 12 minutes. The "total cut" was the total amount removed throughout the full 12 minute test.

Examples 1–14

Examples 1–14 illustrate microwave sintering of alumina-based Abrasive Grain Precursor I containing iron oxide nucleating material under various temperatures, heating rates, and hold times. A stock quantity of Abrasive Grain Precursor I was prepared as described above. Fourteen different microwave sintering runs were carried out using 60 grams of this calcined precursor grain in each run. A box for holding the abrasive grain precursor during microwave sintering was constructed from fibrous zirconia board, which is available from Zircar Products Inc., Florida, N.Y., under the trade designation "Type ZYFB-3" yttria-stabilized zirconia. The sides of this box were 1.3 cm thick, the base was 3.8 cm thick, the cover was 1.9 cm thick, and the internal dimensions were 7.6 cm×7.6 cm×3.8 cm. The box was held together with braided ceramic fiber rope, which is available under the trade designation "NEXTEL 312" from the 3M Company, St. Paul, Minn. Microwave sintering was performed in air using a 6 kW, 2.45 GHz, 0.6 $m^3$ microwave furnace, which is described in "Microwave Sintering of Multiple Alumina and Composite Components," J. D. Katz and R. D. Blake, Am. Ceram. Soc. Bull., 70, 1304–1308 (1991), the disclosure of which is incorporated herein by reference. The temperature of the abrasive grain was monitored with a sapphire lightpipe, which is available under the trade designation "ACCUFIBER" from Luxtron Corp., Santa Clara, Calif.

Table 1, below, summarizes the processing conditions for Examples 1–14. In the course of the fourteen runs, the heating rate, the sintering temperature, and the hold time were varied. The control was a conventionally sintered Abrasive Grain Precursor I, which was sintered at 1300° C. for 15 minutes through a rotating SiC tube furnace (8 cm in diameter, 1.2 m in length) with a 30 cm hot zone.

TABLE 1

Processing Conditions for Examples 1–14

| Example | Time to sintering temp. from 500° C., minutes | Sintering temp., °C. | Hold time at sintering temp., minutes |
| --- | --- | --- | --- |
| 1 | 58 | 1250 | 1 |
| 2 | 23 | 1300 | 1 |
| 3 | 5 | 1350 | 1 |
| 4 | 23 | 1250 | 1 |
| 5 | 6 | 1300 | 1 |
| 6 | 4 | 1250 | none |
| 7 | 4 | 1200 | 1 |
| 8 | 4 | 1100 | 1 |
| 9 | 3 | 1150 | 1 |
| 10 | 26 | 1300 | 5 |
| 11 | 47 | 1300 | 5 |
| 12 | 25 | 1250 | 5 |
| 13 | 48 | 1350 | 5 |
| 14 | 50 | 1400 | 5 |
| Control | Conventional Sintering | 1300 | 15 |

To demonstrate a typical temperature vs. time profile of the microwave sintering process, the power, temperature, and time data for Example 7 are shown in Table 2, below.

TABLE 2

Temperature vs. Time Profile for Example 7

| Forward power, as % of available power | Reflected power, as % of available power | Lightpipe temp., °C. | Cumulative elapsed time, minutes |
| --- | --- | --- | --- |
| 10 | 4 | — | 0 |
| 12 | 4 | — | 2 |
| 14 | 4 | — | 5 |
| 16 | 4 | — | 8 |
| 18 | 4 | — | 10 |
| 18 | 2 | 503 | 11.5 |
| 23 | 3 | 565 | 12 |
| 36 | 5 | 802 | 13 |
| 40 | 6 | 1053 | 14 |
| — | — | 1201 | 15.5 |
| Fluctuate between 10 and 40 | — | 1190–1212 | 16.5 |

The percentage of forward (i.e., applied) and reflected (i.e., unabsorbed) microwave power is based on the total available microwave generator power of 6 kW. The net power consumption is equal to the forward minus reflected power. For example, for forward power of 40% (2.4 kW) and reflected power of 6% (0.36 kW), the power consumed was 2.4 kW–0.36 kW, or 2.04 kW. The sapphire lightpipe measures temperatures only above 500° C. The temperature fluctuated by about ±10° C. during the one-minute hold period at 1200° C.

During the Example 7 run, the abrasive grain temperature was increased by applying increasing amounts of microwave power, while the temperature of the zirconia box actually decreased. This is because the microwave energy initially coupled to the zirconia box, which was more dielectrically lossy than the abrasive grain at moderate temperatures (i.e., less than about 500° C.), which resulted in the heating of the box. The thermal energy in the box was then transferred to the abrasive grain. When the indirectly heated abrasive grain approached a temperature of about 500° C., the grain became sufficiently dielectrically lossy to couple to (i.e., absorb) the microwave energy. A crossover point occurred where the microwaves were absorbed preferentially by the abrasive grain rather than the zirconia box.

The microwave-sintered abrasive grain from all runs, except Examples 8 and 9, approached theoretical density (i.e., were at least about 98.8% of theoretical using 3.99 g/cc as theoretical for this composition), and remained free-flowing (i.e., not bonded or agglomerated together) such that they could be easily poured out of the zirconia box at the completion of a run. Examples 8 and 9 were underfired and retained some of the initial reddish-brown color. Thus, they were not characterized further. Density, crystallite size, and grinding performance of the microwave-sintered abrasive grain for Examples 1–14 were determined and are listed in Table 3, below.

TABLE 3

| Example | Density, g/cm³ | Crystallite size distribution, μm | Grinding Test I, % of control |
| --- | --- | --- | --- |
| 1 | 3.98 | 0.5–1.5 | 94 |
| 2 | 3.98 | 0.5–1.5 | 102 |
| 3 | 3.98 | 0.5–1 | 154 |
| 4 | 3.99 | 1–2 | 83 |
| 5 | 3.98 | 1–2 | 83 |
| 6 | 3.96 | 0.5–1.5 | 92 |
| 7 | 3.94 | 0.5–1 | 109 |
| 8 | — | — | — |
| 9 | — | — | — |
| 10 | 3.99 | 2–3 | 68 |
| 11 | 3.99 | 2–3 | 69 |
| 12 | 3.99 | 1–2 | 75 |
| 13 | 3.99 | 3–4 | 65 |
| 14 | 3.94 | 3–5 | 51 |
| Control | 3.97 | 0.5–1 | 100 |

Average crystallite size data was determined visually from scanning electron microscopy (SEM) fracture surface micrographs. One coated abrasive disc was prepared with each sample of grain sized to a ANSI Grade 40. The discs were tested according to Grinding Test I against a conventionally sintered Abrasive Grain Precursor I as the control.

The data presented in Table 3 shows that the microwave sintering process of the present invention can produce abrasive grain equivalent to control grain which was conventionally sintered under optimum conditions for the composition (i.e., 15 minutes at 1300° C.). This microwave sintering can be achieved at very short hold times, and at temperatures as much as 100° C. lower than the conventional sintering process. The samples from Examples 1, 2, 3, 6, and 7 had a fine crystallite size distribution and their grinding performances were comparable to the conventionally sintered control. The grinding performances of Examples 4, 5, and 10–14 showed a gradual decrease as the crystal size distribution increased. This type of grinding performance behavior is inherent even with the conventionally sintered grain with this composition. This is not meant to say, however, that these grain are not useful for abrasive applications. Even the lowest performing sample (i.e., Example 14) is believed to be a better abrasive grain than other commodity abrasive gain, such as brown fused alumina.

Examples 15–23

For Examples 15–22, 60 gram samples of Abrasive Grain Precursor II were microwave sintered using the same microwave furnace, sample containment technique, and procedures used in Examples 1–14. For Example 23, a 150 gram sample of Abrasive Grain Precursor II was microwave sintered using the microwave furnace and procedures described below for Examples 24–34. The microwave sintering experimental conditions, densities, and the grinding performances of samples from each Example are given in Table 4, below.

TABLE 4

| Example | Heating time from 500° C. to sintering temp., minutes | Sintering temp., °C. | Hold time at sintering temp., minutes | Density, g/cm³ | Grinding Test II, % of control |
| --- | --- | --- | --- | --- | --- |
| 15 | 5 | 1250 | 1 | — | — |
| 16 | 7.5 | 1300 | 1 | 3.92 | 55.3 |
| 17 | 10 | 1300 | 2 | 3.93 | 73.1 |
| 18 | 10 | 1300 | 5 | 3.93 | 80.0 |
| 19 | 7 | 1350 | 1 | 3.93 | 43.5 |
| 20 | 9 | 1350 | 2 | 3.95 | 21.8 |
| 21 | 8 | 1400 | 1 | 3.94 | 27.8 |
| 22 | 10 | 1400 | 2 | 3.93 | 44.4 |
| 23 | 25 | 1350 | 10 | — | — |
| Control | — | 1400 | 5 | 3.89 | 100.0 |

Examples 16–22 approached the theoretical density of the sintered Abrasive Grain Precursor II (i.e., all were within about 97.5% of theoretical, based on a theoretical density of 4.02 g/cm³ for this composition) and the microstructures of the grain for Examples 16–22 were very similar to that of sintered Abrasive Grain Precursor II (the control), which was conventionally sintered at 1400° C. for 5 minutes, through a rotating SiC tube furnace, which is described above in Examples 1–14. Examples 15 and 23 were under-sintered and are not believed to have abrasive utility.

One coated abrasive disc was prepared with each sample of grain, except Examples 15 and 23, screened to a ANSI Grade 36. The discs were tested according to Grinding Test II on 304 stainless steel workpieces against a conventionally sintered Abrasive Grain Precursor II as the control. The grinding test results are listed in Table 4, above. Even the lowest performing microwave sintered grain of this series of examples is believed to be better than commodity abrasives such as fused brown alumina.

Examples 24–34

Examples 24–34 illustrate microwave sintering of 150-gram quantities of abrasive grain using a modified domestic microwave oven as described below. Stock quantities of variously doped alumina-based abrasive grain precursor (Abrasive Grain Precursor III–VI) were prepared as described above.

The abrasive grain precursor were placed in a box made from fibrous zirconia board (Zircar Products, Inc., Types ZYFB-3 and ZYFB-6 yttria-stabilized zirconia). The sides, top, and bottom of this box were 1.25 cm thick, and its interior volume was approximately 197 cm³. The box was thermally insulated by surrounding it with an outer box constructed from 1.25 cm thick sheets of fibrous alumina board (Zircar Products Inc., Type ZAL-45 "AA"). The outer box was held together with braided ceramic fiber rope available from the 3M Company, St. Paul, Minn. under the trade designation "NEXTEL 312." Microwave sintering was carried out in air in a 1300-watt, 2.45 GHz conventional microwave oven modified with water-cooling of its base plate and magnetron, and a mode-stirring antenna to provide a more uniform microwave field (Microwave Materials Technologies, Inc., Oak Ridge, Tenn., Model No. 10-1300). The temperature of the abrasive grain was controlled and monitored with a $MoSi_2$-sheathed, shielded Type S (Pt vs. Pt-10% Rh) thermocouple in conjunction with a Honeywell (Fort Washington, Pa.) 3000 Universal Digital Controller. The abrasive grain formulations, processing conditions, physical properties, and grinding performance for these grain are summarized in Table 5, below.

TABLE 5

| Example | Abrasive Grain Type | Time to reach sintering temp. from 500° C. (minutes) | Sintering temp. (°C.) | Hold time at sintering temp. (minutes) | Density (g/cm³) | Grinding Test II, % of control |
| --- | --- | --- | --- | --- | --- | --- |
| 24 | IV | 25 | 1350 | 5 | | 95.5 |
| 25 | IV | 25 | 1350 | 10 | 3.96 | 97.6 |
| Control (A) | IV | Conventional | 1400 | 5 | 4.00 | 100.0 |
| 26 | IV | 21 | 1350 | 15 | 3.98 | 96.5 |
| 27 | IV | 21 | 1400 | 5 | 4.01 | 92.5 |
| Control (B) | IV | Conventional | 1400 | 5 | 4.00 | 100.0 |
| 28 | VI | 13 | 1350 | 5 | 3.82 | — |
| 29 | VI | 12 | 1350 | 10 | 3.83 | — |
| Control | VI | Conventional | 1350 | 10 | 3.85 | — |
| 30 | III | 25 | 1350 | 5 | 3.91 | 91.4 |
| 31 | III | 13 | 1300 | 5 | 3.86 | 93.4 |
| 32 | III | 16 | 1350 | 5 | 3.79 | 92.9 |
| Control | III | Conventional | 1400 | 5 | 3.83 | 100.0 |
| 33 | V | 19 | 1350 | 10 | — | — |
| 34 | V | 17 | 1400 | 5 | — | — |
| Control | V | Conventional | 1400 | 5 | 3.96 | — |

Two coated abrasive discs were prepared with each type of effectively sintered abrasive grain sample (except Examples 28 and 29) screened to an ANSI Grade 36 (Examples 24, 25, and Control IV(A)), ANSI Grade 50 (Examples 26, 27, and Control IV(B)), or ANSI Grade 36 (Examples 30–32 and Control III). Microwave sintered abrasive grain samples from Examples 33 and 34 were not effectively sintered and therefore these samples were not characterized any further. The discs were tested according to Grinding Test II on 1018 mild steel workpieces against the grain conventionally fired in the rotating SiC tube furnace described above in Examples 1–14 under optimum sintering conditions for that composition, which are listed in Table 5, above.

The grinding performance of the microwave sintered abrasive grain were comparable to conventionally sintered control grain having the same composition. Note that the conventional sintering conditions for the control grain of each particular composition were optimized while the microwave sintering conditions were not necessarily optimized.

With the exception of Examples 33 and 34, all of the examples described in Table 5 produced microwave sintered abrasive grain equivalent (e.g., in density, microstructure, and grinding performance) to conventionally sintered control grain of the same composition. In fact, for all compositions given in Table 5 (except Abrasive Grain Precursor V), the microwave sintering temperature could be about 50° C. lower than optimum conventional sintering temperature for that composition without negatively affecting the density, microstructure, or grinding performance.

Thus, the grinding performance of the sintered alpha alumina-based ceramic abrasive grain made according to the method of the present invention can vary depending on the microwave processing conditions. This does not mean, however, that the abrasive grain with lower grinding performance than conventional sol-gel derived alpha alumina-based abrasive grain is not suitable for any grinding applications.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A method for making free flowing, sintered alpha alumina-based ceramic abrasive grain, the method comprising the steps of:

(a) providing a microwave sintering apparatus comprising a cavity, a microwave generator for generating microwaves and directing them into said cavity, and a power supply for powering said microwave generator;

(b) providing a free flowing, sol-gel derived, calcined alpha alumina-based ceramic abrasive grain precursor in said cavity; and (c) generating microwaves under conditions effective to couple said microwaves with said calcined abrasive grain precursor and sinter said calcined abrasive grain precursor at a temperature of at least about 1150° C. to provide free flowing, sintered alpha alumina-based ceramic abrasive grain having a density of at least about 85% of theoretical and a hardness of at least about 16 GPa; wherein the time from the initiation of coupling microwaves with said calcined abrasive grain precursor to the completion of sintering is no greater than about 60 minutes.

2. The method of claim 1 wherein step (b) includes providing at least a portion of said calcined abrasive grain precursor at a temperature at which said portion couples with said microwaves.

3. The method of claim 1 further including a step of providing an auxiliary susceptor material in close proximity to said calcined abrasive grain precursor, and prior to step (c) generating microwaves under conditions effective to couple said microwaves with said auxiliary susceptor material and transfer thermal energy to said calcined abrasive grain precursor until said calcined abrasive grain precursor reaches a temperature effective to couple with said microwaves.

4. The method of claim 3 wherein said auxiliary susceptor material comprises zirconia.

5. The method of claim 4 wherein said zirconia is a zirconia container.

6. The method of claim 5 wherein said calcined abrasive grain precursor is placed inside said zirconia container.

7. The method of claim 3 wherein said auxiliary susceptor material comprises silicon carbide.

8. The method of claim 7 wherein said auxiliary susceptor material is silicon carbide rods.

9. The method of claim 8 further including an auxiliary susceptor material comprising a zirconia container.

10. The method of claim 1 wherein said conditions effective to couple with, and sinter said abrasive grain precursor include achieving a temperature of said abrasive grain precursor in the range of about 1150° C. to about 1600° C.

11. The method of claim 1 wherein said conditions effective to couple with, and sinter said abrasive grain precursor include achieving a temperature of said abrasive grain precursor in the range of about 1250° C. to about 1450° C.

12. The method of claim 1 wherein said sintered, free flowing alpha alumina-based ceramic abrasive grain have an average crystallite size of less than about 5 micrometers.

13. The method of claim 1 wherein said sintered, free flowing alpha alumina-based ceramic abrasive grain have an average crystallite size of less than about 1 micrometer.

14. The method of claim 1 wherein said sol-gel derived calcined alpha alumina-based abrasive grain precursor is prepared from a dispersion containing a nucleating material.

15. The method of claim 14 wherein said abrasive grain precursor includes a metal oxide modifier.

16. The method of claim 1 wherein said sintering is carried out in air.

17. The method of claim 1 wherein said sintering is carried out at ambient pressure.

18. A method for making free flowing, sintered alpha alumina-based ceramic abrasive grain, the method comprising the steps of:

(a) providing a microwave sintering apparatus comprising a cavity, a microwave generator for generating microwaves and directing them into said cavity, and a power supply for powering the microwave generator;

(b) providing a free flowing, sol-gel derived, calcined alpha alumina-based ceramic abrasive grain precursor in said cavity;

(c) providing an auxiliary susceptor material in close proximity to said calcined abrasive grain precursor in said cavity; wherein said auxiliary susceptor material is capable of coupling with said microwaves at a temperature below that at which said calcined abrasive grain precursor couples with said microwaves, and is capable of transferring thermal energy to said calcined abrasive grain precursor;

(d) generating microwaves under conditions effective to couple said microwaves with said auxiliary susceptor material and transfer thermal energy to said calcined abrasive grain precursor until said calcined abrasive grain precursor reaches a temperature effective to couple with said microwaves;

(e) generating microwaves under conditions effective to couple with said calcined abrasive grain precursor and to raise the temperature of the calcined abrasive grain precursor to an effective sintering temperature; and (f) generating microwaves under conditions effective to sinter said calcined abrasive grain precursor at a temperature of at least about 1150° C. for no greater than about 60 minutes to provide free flowing, sintered alpha alumina-based ceramic abrasive grain having a density of at least about 85% of theoretical and a hardness of at least about 16 GPa.

19. The method of claim 18 wherein steps (e) and (f) occur in no greater than about 60 minutes.

20. The method of claim 18 wherein said step of providing calcined abrasive grain precursor comprises:

(a) placing a plurality of flee flowing, sol-gel derived, dried alpha alumina-based ceramic abrasive grain precursor in said cavity; and (b) generating microwaves under conditions effective to couple microwaves with said dried abrasive grain precursor and form calcined alpha alumina-based ceramic abrasive grain precursor.

21. The method of claim 18 wherein said auxiliary susceptor material comprises a fibrous zirconia container.

22. The method of claim 21 wherein said calcined abrasive grain precursor is placed inside said fibrous zirconia container.

23. The method of claim 18 wherein said sintering occurs at a temperature of about 1250°–1450° C.

24. The method of claim 18 wherein said auxiliary susceptor material comprises silicon carbide.

25. A method for making an abrasive product, the method comprising:

(a) providing a microwave sintering apparatus comprising a cavity, a microwave generator for generating microwaves and directing them into said cavity, and a power supply for powering said microwave generator;

(b) providing a container made of fibrous zirconia in said cavity;

(c) providing a plurality of free flowing, sol-gel derived, calcined alpha alumina-based ceramic abrasive grain precursor inside said fibrous zirconia container;

(d) generating microwaves under conditions effective to couple said microwaves with said fibrous zirconia and transfer thermal energy to said calcined abrasive grain precursor until said calcined abrasive grain precursor reaches a temperature effective to couple with said microwaves;

(e) generating microwaves under conditions effective to couple with said calcined abrasive grain precursor and to raise the temperature of the calcined abrasive grain precursor to an effective sintering temperature; and (f) generating microwaves under conditions effective to sinter said calcined abrasive grain precursor at a temperature of at least about 1150° C. for no greater than about 60 minutes to provide free flowing, sintered alpha alumina-based ceramic abrasive grain having a density of at least about 85% of theoretical and a hardness of at least about 16 GPa; and (g) incorporating said sintered alpha alumina-based ceramic grain into an abrasive product.

\* \* \* \* \*